United States Patent
Kamata

(10) Patent No.: US 9,435,644 B2
(45) Date of Patent: Sep. 6, 2016

(54) DIGITAL COMPENSATION FOR NON-LINEARITY IN DISPLACEMENT SENSORS

(71) Applicant: Schlumberger Technology Corporation, Sugar Land, TX (US)

(72) Inventor: Masahiro Kamata, Kawasaki (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 602 days.

(21) Appl. No.: 13/891,192

(22) Filed: May 10, 2013

(65) Prior Publication Data

US 2014/0336967 A1    Nov. 13, 2014

(51) Int. Cl.
    *G01B 21/16*    (2006.01)
    *G01B 21/04*    (2006.01)
    *G01D 3/02*     (2006.01)
    *G01V 1/18*     (2006.01)

(52) U.S. Cl.
    CPC .................. *G01B 21/04* (2013.01); *G01D 3/02* (2013.01); *G01V 1/184* (2013.01)

(58) Field of Classification Search
    CPC .............................. G01V 1/184; G01B 21/04
    USPC ............ 702/86, 94, 104; 367/162, 178, 182, 367/185, 187, 13, 25, 38; 342/127, 174
    See application file for complete search history.

(56) References Cited

U.S. PATENT DOCUMENTS

| | | | |
|---|---|---|---|
| 4,792,198 A | 12/1988 | Sherwood | |
| 4,792,931 A | 12/1988 | Nishida et al. | |
| 5,133,214 A | 7/1992 | Hanson et al. | |
| 5,983,699 A | 11/1999 | Guralp et al. | |
| 6,856,281 B2 * | 2/2005 | Billington | G01S 7/4004 342/118 |
| 6,901,801 B2 | 6/2005 | Campbell et al. | |
| 7,639,567 B2 * | 12/2009 | Sitton | G01V 1/005 181/113 |
| 8,125,852 B2 * | 2/2012 | Kamata | G01V 1/164 367/162 |
| 8,159,904 B2 | 4/2012 | Bainbridge et al. | |
| 8,280,666 B2 * | 10/2012 | Sill | G01D 18/00 702/104 |
| 8,462,585 B2 * | 6/2013 | Sitton | G01V 1/005 181/113 |

(Continued)

FOREIGN PATENT DOCUMENTS

| | | | | |
|---|---|---|---|---|
| JP | 05127672 | A | * | 5/1993 |
| JP | 405127672 | A | * | 5/1993 |

(Continued)

OTHER PUBLICATIONS

E. Wielandt and G. Streckeisen, "The Leaf-Spring Seismometer: Design and Performance," Bulletin of the Seismological Society of America, vol. 72, No. 6, pp. 2349-2367, Dec. 1982.

(Continued)

*Primary Examiner* — Carol S Tsai
(74) *Attorney, Agent, or Firm* — Daryl R. Wright; Jody DeStefanis

(57) ABSTRACT

Systems, apparatuses and methods for digital compensation for total harmonic distortion in a displacement sensor. The methods can include determining a total harmonic distortion compensation function for a displacement sensor; using the displacement sensor to measure a displacement by generating an output signal with total harmonic distortion; digitizing the distorted output signal to generate distorted output data; applying the total harmonic distortion compensation function to the distorted output data to generate undistorted output data; and outputting the undistorted output data.

16 Claims, 20 Drawing Sheets

(56) References Cited

U.S. PATENT DOCUMENTS

| | | | | |
|---|---|---|---|---|
| 8,462,587 B2* | 6/2013 | Sitton | G01V 1/005 181/113 |
| 8,462,588 B2* | 6/2013 | Sitton | G01V 1/005 181/113 |
| 8,462,589 B2* | 6/2013 | Sitton | G01V 1/005 181/113 |
| 8,687,465 B2* | 4/2014 | Kamata | G01V 1/164 367/185 |
| 8,913,464 B2* | 12/2014 | Kamata | G01V 1/182 367/182 |
| 2002/0097180 A1* | 7/2002 | Geisheimer | G01S 13/56 342/127 |
| 2003/0188585 A1* | 10/2003 | Esser | G01N 3/08 73/826 |
| 2006/0227845 A1* | 10/2006 | Degertekin | G01D 5/38 372/102 |
| 2009/0073807 A1* | 3/2009 | Sitton | G01V 1/005 367/38 |
| 2010/0020636 A1* | 1/2010 | Kamata | G01V 1/16 367/13 |
| 2010/0149915 A1* | 6/2010 | Sitton | G01V 1/005 367/38 |
| 2010/0149916 A1* | 6/2010 | Sitton | G01V 1/005 367/38 |
| 2010/0149922 A1* | 6/2010 | Sitton | G01V 1/005 367/92 |
| 2010/0157734 A1* | 6/2010 | Sitton | G01V 1/005 367/41 |
| 2010/0296366 A1* | 11/2010 | Kamata | G01V 1/164 367/25 |
| 2011/0194375 A1* | 8/2011 | Kamata | G01V 1/16 367/13 |
| 2012/0063263 A1* | 3/2012 | Kamata | G01V 1/182 367/38 |
| 2012/0120762 A1* | 5/2012 | Kamata | G01V 1/164 367/25 |
| 2012/0314537 A1* | 12/2012 | Kamata | G01V 1/164 367/25 |
| 2013/0076293 A1 | 3/2013 | Chen et al. | |
| 2014/0140179 A1* | 5/2014 | He | B06B 1/10 367/190 |

FOREIGN PATENT DOCUMENTS

| | | |
|---|---|---|
| WO | 2006/009608 | 1/2006 |
| WO | 2012/094188 | 7/2012 |

OTHER PUBLICATIONS

International search report and written opinion for the equivalent PCT patent application No. PCT/US2014/037331 issued on Sep. 2, 2014.

* cited by examiner

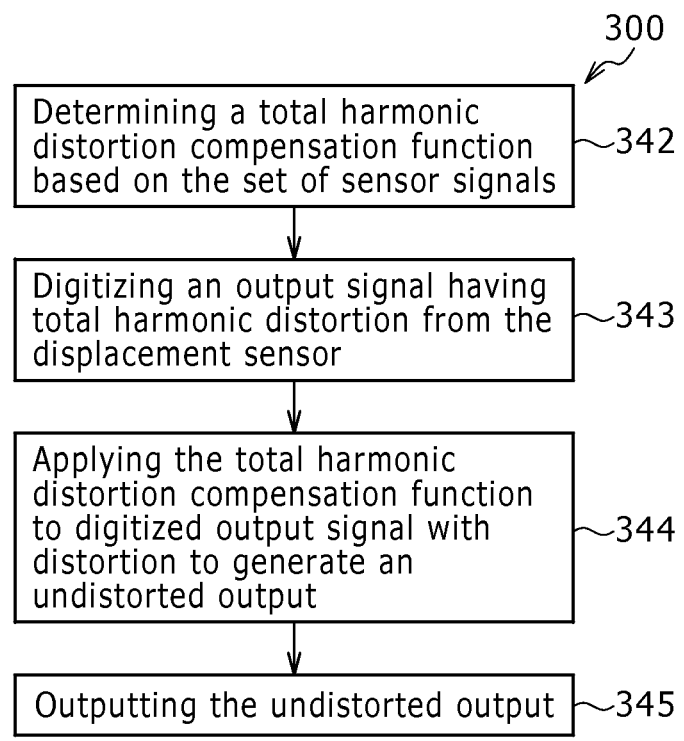

Improved plot

DIGITAL COMPENSATION FOR NON-LINEARITY IN DISPLACEMENT SENSORS

BACKGROUND

The present disclosure relates to displacement sensors generally. More specifically, the present disclosure relates to digital compensation for non-linearity in displacement measurements.

Displacement can be measured using a capacitive sensor, a differential transformer, or an optical transducer. Displacement sensors can have various sources of non-linearity. The non-linearity may be reduced by suitable mechanisms and electronics. If a displacement sensor is used to measure vibration, the non-linearity can appear as a total harmonic distortion. Such displacement sensors are often used for servo accelerometers, broadband seismometer, or force balance seismometer, as described in U.S. Pat. Nos. 5,133,214; 6,901,801; 8,159,904; 8,125,852; 4,792,198. If a displacement sensor is used with a mass-spring system, the non-linearity of the suspension spring may also add to the total non-linearity of the displacement sensor.

SUMMARY

In at least one aspect, the disclosure relates to a method for digital compensation for total harmonic distortion in a displacement sensor. The method can include determining a total harmonic distortion compensation function for a displacement sensor. In some embodiments, the compensation function can be determined based on reference input displacements and resulting output signals from the displacement sensor. In some embodiments, the compensation function can be determined upon a knowledge of input-output characteristics of the displacement sensor. In some embodiments, the compensation function can be obtained by curve fitting input and output data. The method can also include using the displacement sensor to measure a displacement by generating an output signal with total harmonic distortion. The method can further include digitizing the distorted output signal to generate distorted output data. The method can also include applying the total harmonic distortion compensation function to the distorted output data to generate undistorted output data that is indicative of the true (undistorted) displacement to be measured. In some embodiments, the undistorted data can be obtained by interpolating input and output data stored in a lookup table using the distorted output data. The method can further include outputting the undistorted output data.

In at least one aspect, the disclosure relates to an apparatus for digital compensation for total harmonic distortion in a displacement sensor. The apparatus can include a compensation calculation module that is configured to determine a total harmonic distortion compensation function for a displacement sensor. In some embodiments, the compensation calculation module is configured to determine the compensation function based on reference input displacements and resulting output signals from the displacement sensor. In some embodiments, the compensation calculation module is configured to determine the compensation function upon a knowledge of input-output characteristics of the displacement sensor. In some embodiments, the compensation calculation module is configured to obtain the compensation function by curve fitting input and output data. The apparatus can also include a digitization module that is configured to digitize a distorted output signal from the displacement sensor to generate distorted output data. The apparatus can further include a distortion compensation module that is configured to apply the total harmonic distortion compensation function to the output data with distortion to generate undistorted output data. In some embodiments, the apparatus can include a lookup table module that is configured to obtain the undistorted output data by interpolating input and output data stored in a lookup table using the distorted output data. The apparatus can also include an output interface configured to output the undistorted output data.

In at least one aspect, the disclosure relates to a sensor. The sensor can includes a vibration transducer having a moving mass. In some embodiments, the sensor can include a geophone or an accelerometer. The sensor can also include a displacement sensor that is configured to measure a true displacement of the moving mass, where the displacement sensor is digitally compensated for total harmonic distortion. In some embodiments, the displacement sensor can be digitally compensated for total harmonic distortion by: determining a total harmonic distortion compensation function for the displacement sensor; generating an output signal having total harmonic distortion from a displacement of the moving mass; digitizing the distorted output signal to generated output data with distortion; and applying the total harmonic distortion compensation function to the distorted output data to generate undistorted output data indicative of the true displacement of the moving mass. In some cases, the compensation function can be determined based on reference input displacements and resulting output signals from the displacement sensor. In some cases, the compensation function can be determined upon a knowledge of input-output characteristics of the displacement sensor. In some cases, the compensation function can be obtained by curve fitting input and output data. In some cases, the undistorted output data can be obtained by interpolating input and output data stored in a lookup table using the distorted output data.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Embodiments of systems, apparatuses, and methods for digital compensation for total harmonic distortion in a displacement sensor are described with reference to the following figures. Like numbers are used throughout the figures to reference like features and components.

FIG. 1-2 shows an example capacitive displacement sensor where non-linearity is reduced;

FIG. 1-3 shows a difference (error) determined in displacements respectively measured by the displacement sensor of FIG. 1-2 and a reference sensor;

FIG. 1-4 is an example of a capacitive displacement sensor mounted on a moving mass of a geophone;

FIG. 2 is a block diagram of a system for digital compensation for total harmonic distortion in a displacement sensor in accordance with the present disclosure;

FIG. 3 is a flowchart of a method for digital compensation for total harmonic distortion in a displacement sensor in accordance with the present disclosure;

FIG. 4 shows a plot of an input-output characteristic of a system to illustrate the input-output relation;

DETAILED DESCRIPTION

In the following description, numerous details are set forth to provide an understanding of the present disclosure. However, it will be understood by those skilled in the art that the present disclosure may be practiced without these details and that numerous variations or modifications from the described embodiments are possible.

Figure 1:
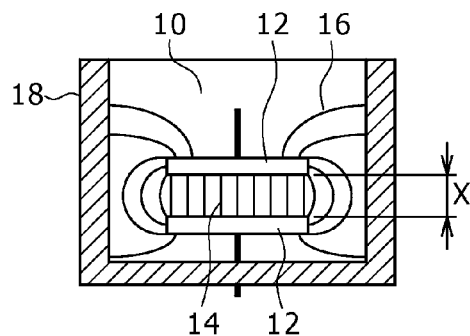
FIG. 1-1 shows a capacitor with surrounding structure.

As an example, FIG. 1-1 shows the non-linearity errors that may be caused by a capacitive displacement transducer. As shown in FIG. 1-1, a capacitor 10 includes a pair of parallel metallic plates 12 spaced at a distance x. Near the center of the two facing plates 12, the electric flux lines 14 are relatively straight and the capacitance C is $$C = \varepsilon \frac{S}{x} \qquad \text{Equation 1}$$

where S is the surface area of the plates 12, $\in$ is the permittivity (dielectric constant) of the material between the plate (for vacuum, $\in \approx 8.8542 \times 10^{-12}$ F/m). As shown in FIG. 1-1, the electric flux lines 16 to the surrounding structures 18 can create stray capacitance. As a result, Equation 1 may no longer be accurate.

Figures 1, 2:
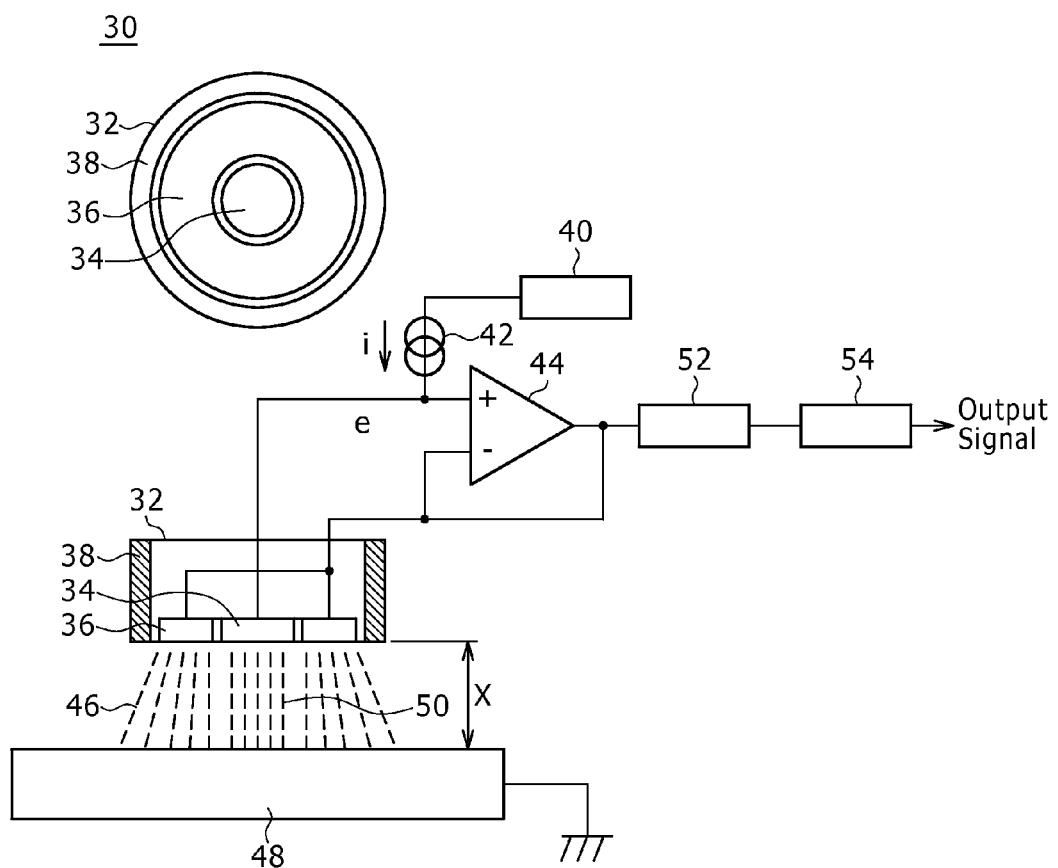

As an example for displacement sensors, FIG. 1-2 shows a capacitive displacement sensor 30. The capacitive displacement sensor includes a probe 32 having a measurement electrode 34 and a guard ring 36 mounted in a shielded housing 38. As shown in FIG. 1-2, an oscillator 40 can generate a reference AC signal and a constant current circuit 42 may feed a current signal i to the measurement electrode 34. An amplifier 44 can amplify the signals on the measurement electrode 34 and drive the guard ring 36. Since the output of the amplifier 44 is connected to the negative input of the amplifier 44, the amplitude of driving signal is the same as the signal e at the measurement electrode 34. The guard ring 36 can create electric flux lines 46 that may spread to a target electrode 48 and prevent spreading of electric flux lines 50 created by the measurement electrode 34. Then the amplitude of the signal at the measurement electrode 34 is $$e = \frac{i}{\omega C} = \frac{i}{\omega \varepsilon S} x \qquad \text{Equation 2}$$

where i is the current injected to the measurement electrode 34, $\omega$ is the frequency of the reference AC signal generated by the oscillator 40. The amplitude of the signal e is inversely proportional to the capacitance C created between the measurement electrode 34 and the target electrode 48 and is proportional to the distance x between the two electrodes 34, 48, the overlapping area S of the two electrodes 34, 48, and the permittivity $\in$ of the media (e.g., air) between the two electrodes 34, 48.

The signal from the amplifier 44 is rectified by a rectifier 52 to convert the AC signal to a DC signal. A linearizer 54 further linearizes the signal to compensate the uncompensated part by the guard ring 36 and outputs a DC signal that is proportional to the distance x.

Figures 1, 2, 3:
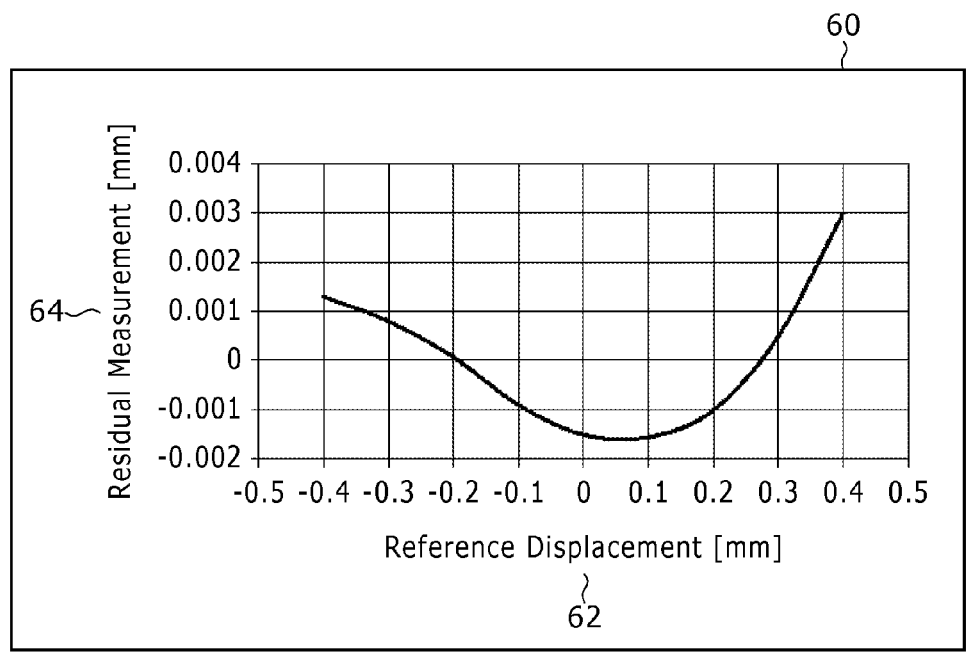

FIG. 1-3 is a plot 60 showing an example of a determined difference (errors) between measured displacement of the capacitive displacement sensor 30 shown in FIG. 1-2 and a displacement measured by a reference sensor. The reference displacement can, for example, be measured by a high precision optical interferometer.

For plot 60, the horizontal axis 62 is the reference displacement and the vertical axis 64 is the determined displacement by the capacitive displacement sensor minus the reference displacement. The difference indicates the residual error of the capacitive displacement sensor 30, despite that guard ring 36 and linearizer 54 are used for compensation. This error is due mainly to the spreading of electric flux and the stray capacitance.

Capacitive displacement sensor, differential transformer or optical displacement sensor is often used to measure displacement of a moving mass to detect low frequency seismic waves, such as broadband seismometers or force balance seismometers, as described in U.S. Pat. Nos. 5,983,699; 4,792,931; 8,125,852; and "THE LEAF-SPRING SEISMOMETER: DESIGN AND PERFORMANCE," BY E. WIELANDT AND G. STRECKEISEN, Bulletin of the Seismological Society of America, Vol. 72, No. 6, pp. 2349-2367, December 1982.

FIG. 1-4 shows an example 70 of a capacitive displacement sensor mounted on a moving mass of a geophone, such as the geophone described in U.S. Pat. No. 8,125,852. The moving mass includes a pair of coils 72 wound on a bobbin 74 that is suspended by a pair of springs 76 in the magnetic flux 78 field created by magnets 80, a pole piece 82 and a housing 84. Moving electrode(s) 86 of the displacement sensor is mounted on each end of the bobbin 74. Fixed electrode(s) 88 of the displacement sensor is mounted on the top and bottom caps 90 as shown in FIG. 1-4. The electrode(s) 86 disposed on the bobbin 74 and the electrode(s) 88 fixed on the caps 90 create a capacitance. Since the electrode(s) 86 on the bobbin 74 moves with the moving mass relative to the housing 84, the capacitance changes due to the displacement of the moving mass. The displacement signal can be measured with the electronics shown in FIG. 1-2.

When measuring seismic waves or ground vibration, non-linearity can cause harmonic distortion. If a non-linear geophone is excited by a sinusoidal vibration, the non-linearity may appear as harmonics of the excited vibration frequencies. The ratio between the amplitude of square root of summed square of all the harmonic components and the amplitude of fundamental component can be defined as the total harmonic distortion.

Methods for digitally compensating for total harmonic distortion are provided, as compared with altering the actual hardware design of the displacement sensor in order to compensate for total harmonic distortion. Based on mathematical simulation as well as known sensor measurements, it is possible to determine a total harmonic distortion compensation function for the displacement sensor. For example, the compensation function can be determined based on reference input displacements and resulting output signals from the displacement sensor. The compensation function can also be determined upon a knowledge of input-output characteristics of the displacement sensor, by design or modeling, for example. The methods can involve storing the compensation function in a look-up table, such that with a digitized output signal having total harmonic distortion from the displacement sensor, the total harmonic distortion compensation function can be applied to the digitized distorted output signal to generate digitized undistorted output signal.

FIG. 2 is a block diagram of a system 235, such as one implemented in software, for digital compensation for total harmonic distortion in a displacement sensor in accordance with the present disclosure. The system 235 includes various modules or units that are configured to carry out the digital compensation scheme of the present disclosure. In an embodiment, the system 235 includes a digitization module 236 that can digitize a signal. For example, the digitization module 236 can digitize an output electrical signal from a displacement sensor having total harmonic distortion into distorted output data for compensation.

In an embodiment, the system 235 includes a compensation calculation module 237 that determines a total harmonic distortion compensation function for the displacement sensor. In some embodiments, the compensation function may be determined based on input displacements measured by a reference device and corresponding output signals that the displacement sensor generates in response to the input displacements. In some embodiments, the compensation function may be determined upon a knowledge of input-output characteristics of the displacement sensor. For example, CAD (Computer Aided Design) can be used to determine the input-output characteristics if the displacement sensor configuration is known. FEM (Finite Element Method) can be used to model the stray capacitance of the surrounding structure for the displacement sensor. Various calculations may be used by the compensation calculation module 237, as will be described further below. The system 235 may also include a compensation table module 239 that stores the total harmonic distortion compensation function, as described below. For example, the compensation table store module 239 may be in the form of a look-up table for input-output characteristics that can be previously obtained or simulated.

In an embodiment, the system 235 includes a distortion compensation module 238 configured to apply the total harmonic distortion compensation function to output data with total harmonic distortion to generate undistorted output data.

In an embodiment, the system 235 also includes an output interface 240 configured to output the undistorted output data. The undistorted output data may be displayed graphically, for example, or numerically. The undistorted output data may be in the form of a log.

FIG. 3 is a flowchart of a method for digital compensation for total harmonic distortion in a displacement sensor in accordance with the present disclosure. The method for digital compensation for total harmonic distortion in a displacement sensor can include a variety of calculations or manipulations of sensor signal data in a system such as that described with respect to FIG. 2. As shown, the method 300 commences with determining at 342 a total harmonic distortion compensation function for a displacement sensor. The compensation function can be determined, based on reference input displacement and resulting output signal from the displacement sensor, or upon a knowledge of input-output characteristics of the displacement sensor. The form of the total harmonic distortion compensation function is discussed further below.

The method can proceed with digitizing at 343 an output signal having total harmonic distortion from the displacement sensor. The method can include applying at 344 the total harmonic distortion compensation function to the digitized distorted output signal to generate a digitized undistorted output signal. The method can also include outputting at 345 the undistorted output, in either a graphical, numerical, or visual format.

In an embodiment, the method can optionally include storing the total harmonic distortion compensation function in, for example, a compensation function look-up table.

Figures 1, 2, 3, 4:
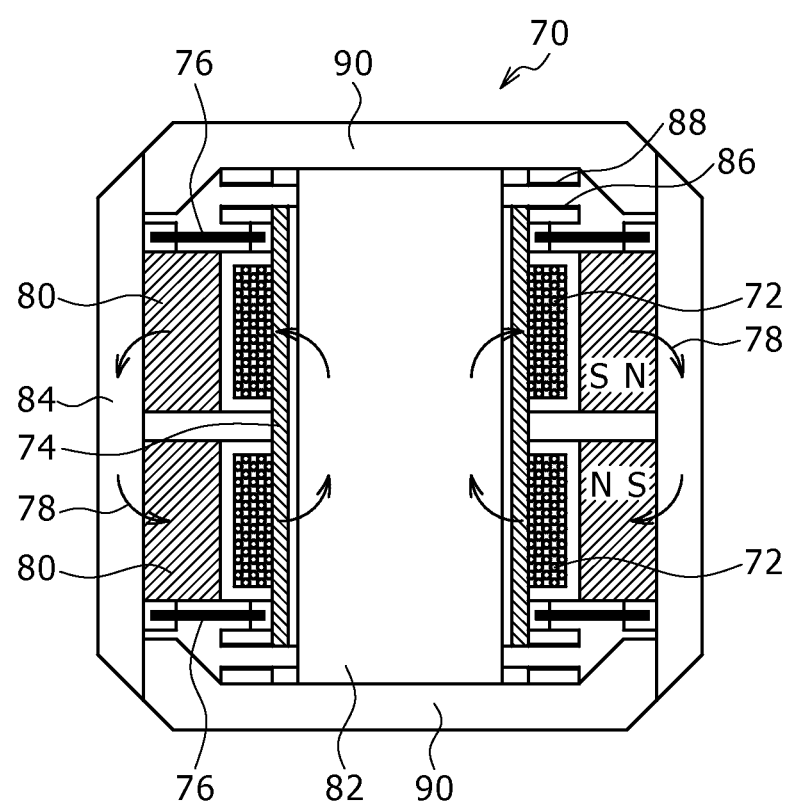
Figure 2:
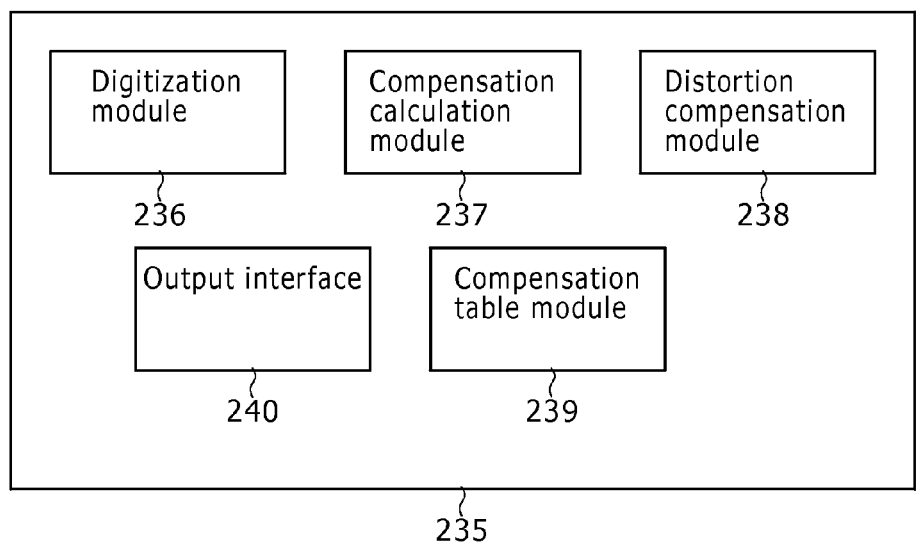
Figure 4:
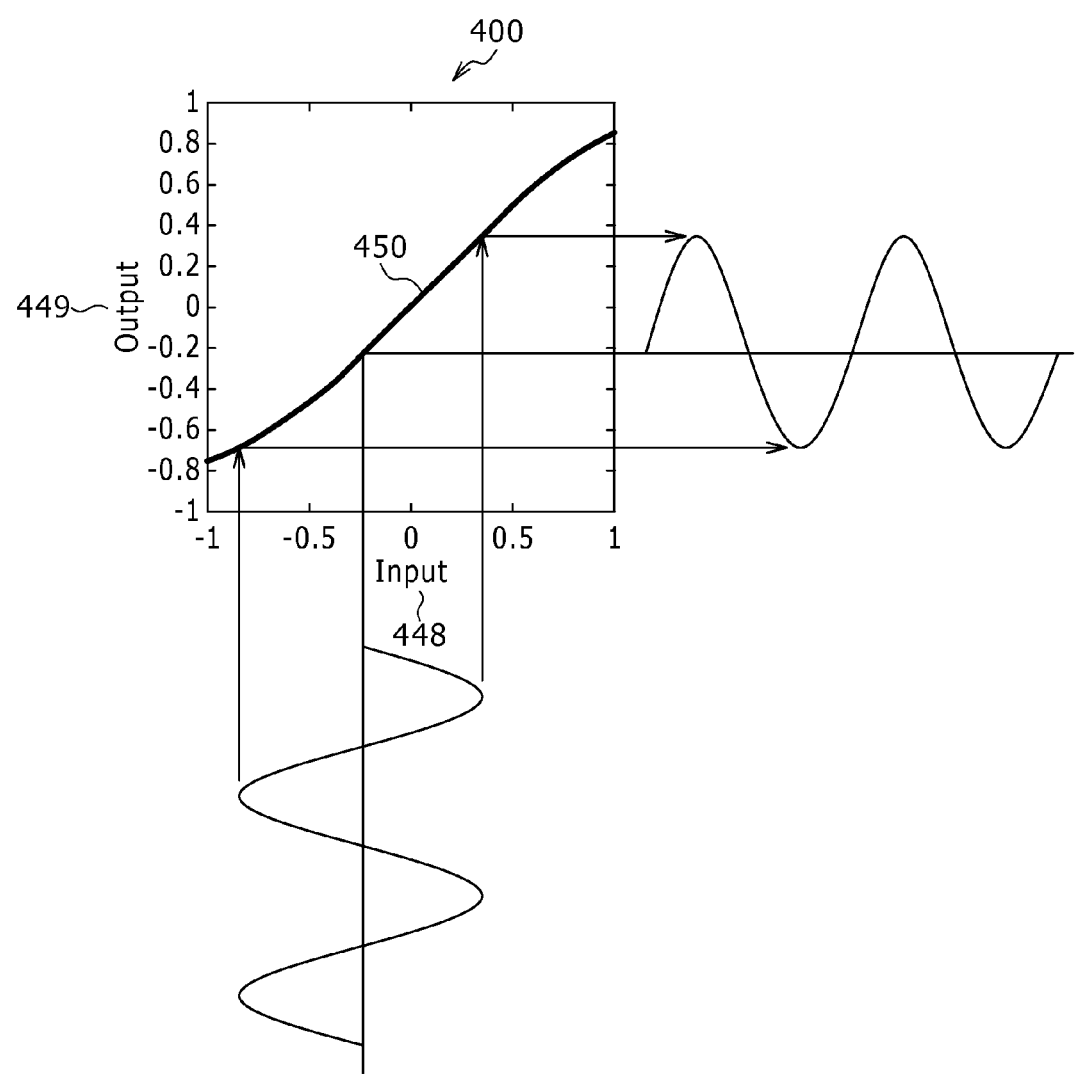

FIG. 4 shows a plot 400 of an input-output characteristic of a system. As can be seen, the input 448 and the output 449 show a one-to-one correspondence in the input-output characteristic line 450. FIG. 4 is shown to illustrate the relationship where, by knowing the input-output characteristics, the output can be found from a given input. The input-output characteristic line 450 is quite linear when the input amplitude is small; however, the line is bent for large amplitude input. The amplitude of a large signal is reduced due to the non-linearity of the system.

Figure 5:
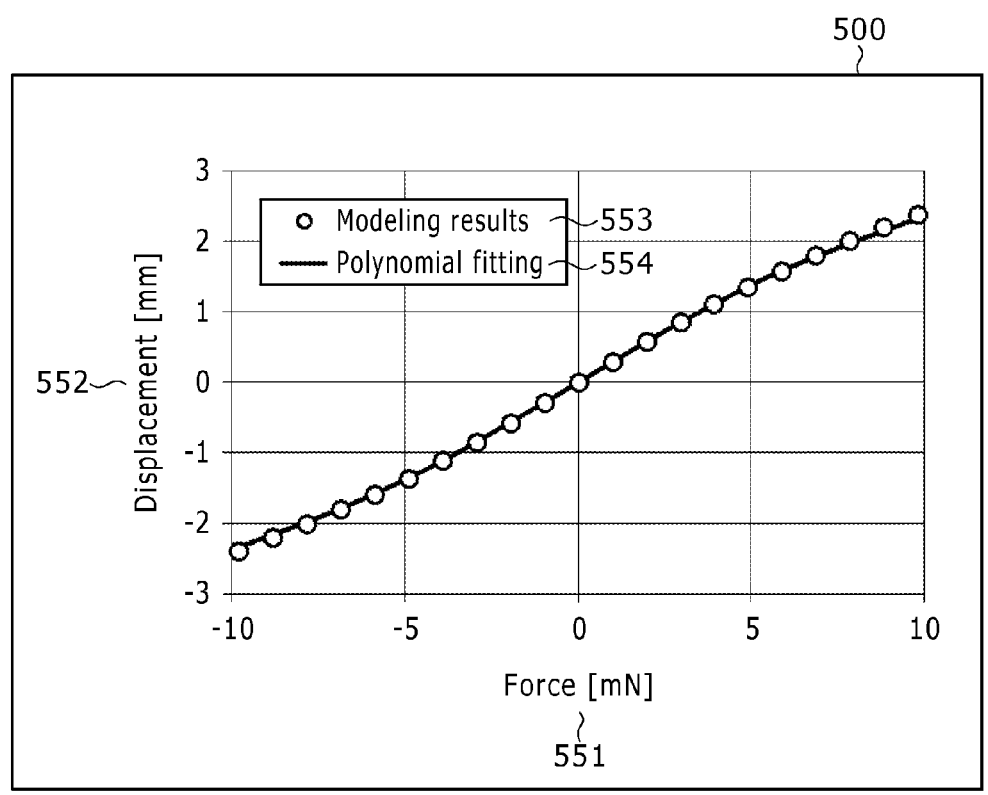
FIG. 5 shows a plot of a modeled non-linearity of a spring and its polynomial approximation.

Turning now to FIG. 5, plot 500 shows a plot of non-linear characteristics of a spring calculated from modeling for an example of simulation. The horizontal axis 551 is the force on the spring in millinewtons (mN). The vertical axis 552 is the displacement of the mass in a simulation sensor, in millimeters (mm). The circles 553 in FIG. 5 show a modeled result of a spring design for a sensor. For a small displacement force, the spring displacement in distance is linear and proportional to the force applied. As the displacement force grows, the resulting spring displacement is no longer linear; however, the displacement of the mass does vary as a function of the applied force.

The displacement of the mass can be approximated by a polynomial, as plotted in FIG. 5 as polynomial fitting line 554, as $$y=0.2965x-0.0009x^3+0.000003x^5 \quad \text{Equation 3}$$

By using Equation 3, the output signal can be simulated based on the modeled design of the spring. This is a non-linearity based on the spring, and there can be other sources of non-linearity, such as non-linearity due to stray force in a capacitive displacement sensor. In many cases, modeling of the non-linearity can be difficult and complex. In such cases, the input-output characteristics may need to be calculated based on measurements. The input-output characteristics may be stable and repeatable, as a function of the design choices for the springs utilized in the sensor. The input-output characteristics may even be known from the design and are measurable.

Figure 6:
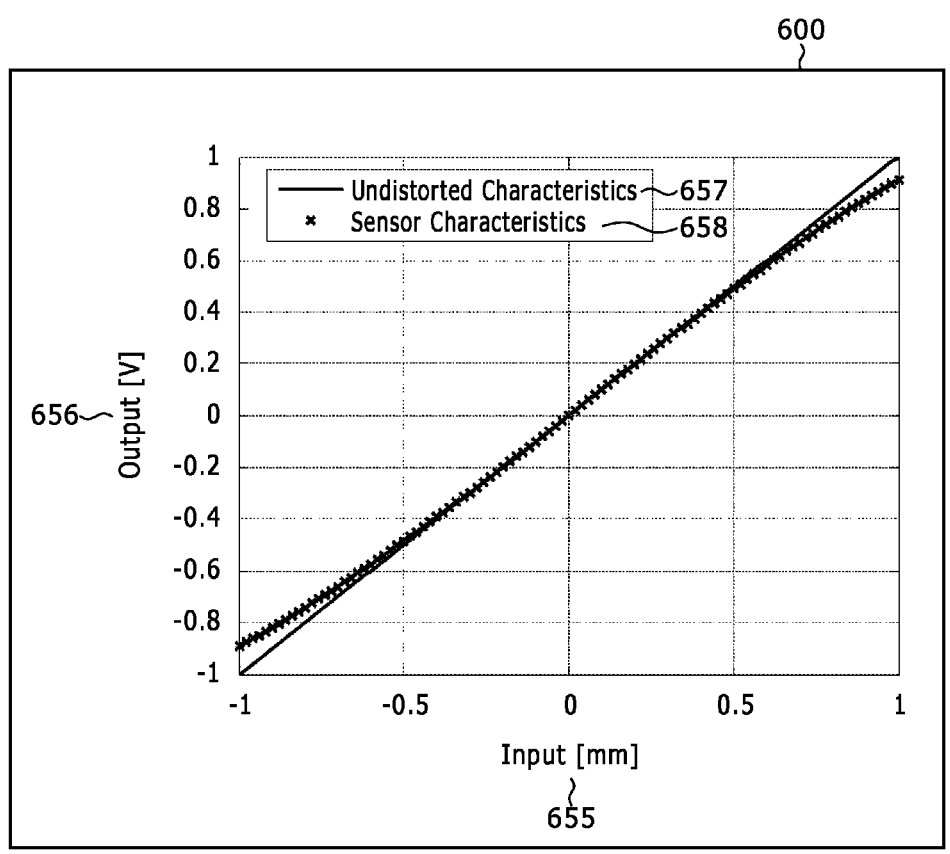
FIG. 6 shows a comparison between input-output characteristics for an undistorted sensor and a non-linear sensor (simulated results)

FIG. 6 shows a plot 600 illustrating the input-output characteristics of a simulated displacement sensor including the total harmonic distortion introduced. The horizontal axis 655 is the input in millimeters, while the vertical axis 656 is the output in volts (V). The input-output characteristics for an undistorted sensor are shown by straight line 657, while the simulated characteristics are plotted at 658.

The input can be represented as displacement x and the output as electric signal e. In this example, the non-linearity reflected in the plot 658 may be expressed by the following function:

$$e=x+ax^2+bx^3 \quad \text{Equation 4}$$

where a=0.01 and b=0.1. The gain can be assumed to be 1 [V/mm]. The straight line 657 is the ideal response and the sensor output is distorted if the displacement is relatively large—the plots 657 and 658 deviate from one another starting around a displacement of 0.5 mm. Thus, Eq. 4 is an input-output function that describes the input-output characteristics of the example displacement sensor.

Figure 7:
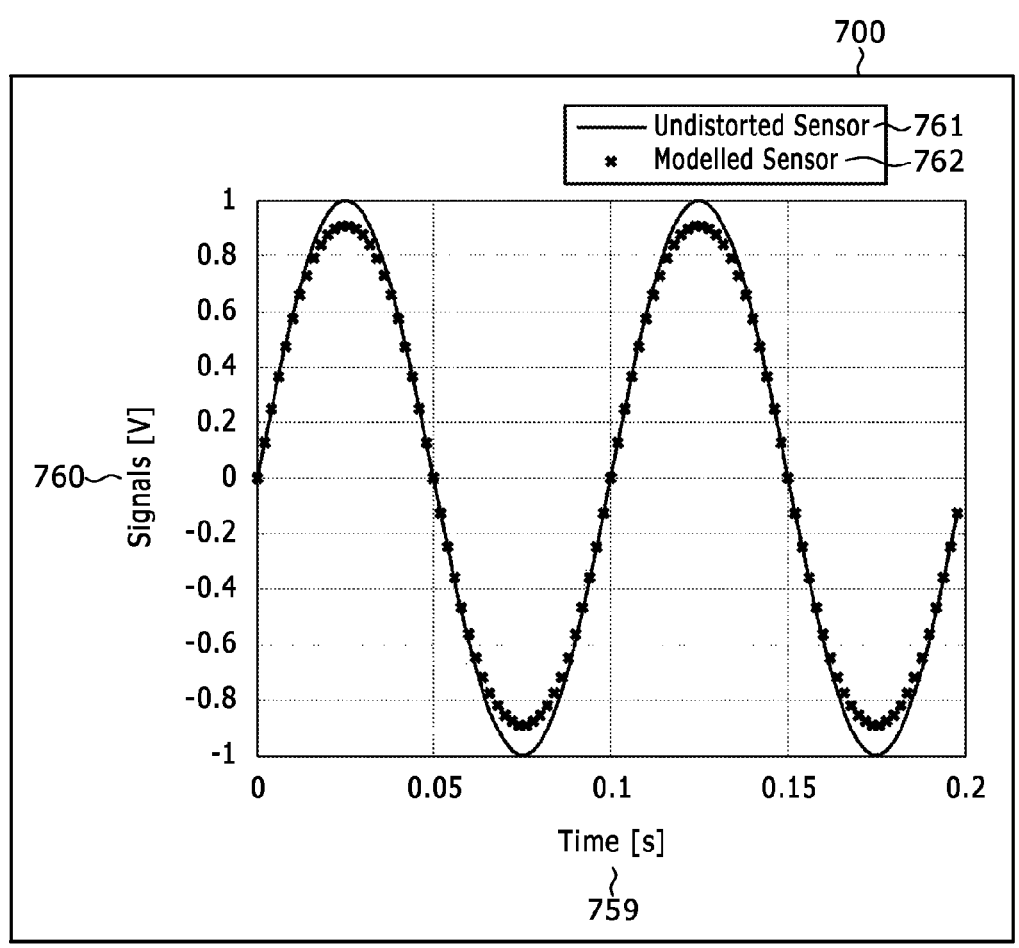
FIG. 7 shows a comparison between output signals in response to sinusoidal input for an undistorted sensor and a non-linear sensor whose modeled input-output characteristics are shown in FIG. 6, illustrating the total harmonic distortion for the non-linear sensor by simulation.

FIG. 7 shows a plot 700 illustrating the total harmonic distortion for a modeled sensor whose input-output characteristics are shown FIG. 6. The horizontal axis 759 is time in seconds (s), while the vertical axis 760 is the output signal in volts (V). FIG. 7 shows the respective output signal e in response to a 10 Hz sinusoidal displacement input x from an undistorted sensor and a modeled sensor described above defined by Eq. 4. The sinusoidal input x can be represented by the following function:

$$x=\sin(2\pi ft) \quad \text{Equation 5}$$

where f is frequency (in this example f=10 Hz) and t is time.

The output response for the undistorted sensor (which has no total harmonic distortion) is plotted by solid line 761, while the output response for the modeled sensor is plotted at 762, showing total harmonic distortion. The two plots 761 and 762 deviate from one another around the peaks and the valleys of the sine curves.

Figure 8:
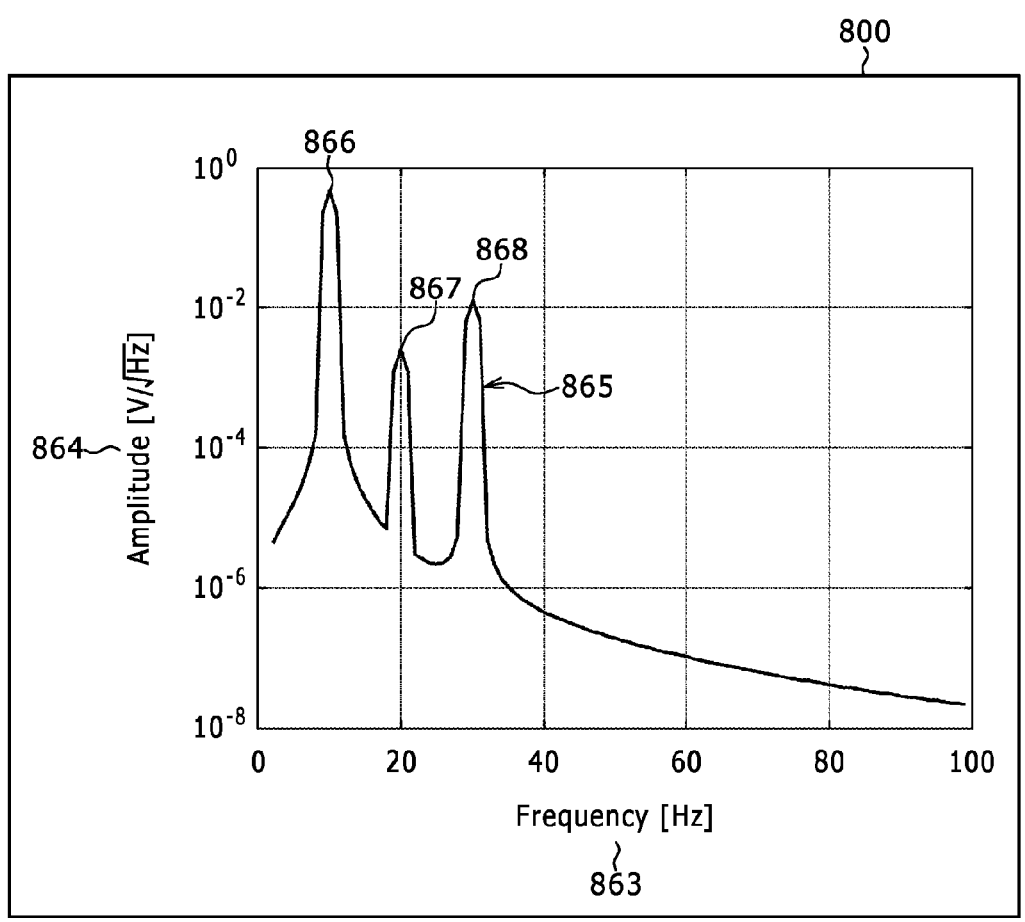
FIG. 8 shows a plot of amplitude spectra of the modeled non-linear sensor characterized by FIGS. 6 and 7.

The amplitude fr of a frequency analysis of output signal is shown in FIG. 8. Specifically, FIG. 8 shows a plot 800 of amplitude spectra 865 of the modeled non-linear sensor characterized by FIGS. 6 and 7. The horizontal axis 863 is frequency in Hertz (Hz), while the vertical axis 864 is amplitude in Volts per square root Hertz (V/√Hz). The fundamental frequency 866 is at 10 Hz. The amplitude of the second harmonics 867 at 20 Hz is about 0.5% of the amplitude of the fundamental frequency, and the amplitude of the third harmonics 868 at 30 Hz is about 2.5%. According to the amplitude spectra 865, the total harmonic distortion (THD) may be defined by taking a square root of sum of square of the amplitudes of all the harmonics, except the amplitude of the fundamental component, in the following function:

$$THD = \frac{\sqrt{\sum_{i=2}^{n} fr_i^2}}{fr_1} \quad \text{Equation 6}$$

where n is the number of harmonics (for example, 1 represents the fundamental frequency, 2 represents the second harmonic, 3 represents the third harmonic, and so on).

Typically up to $5^{th}$ harmonics can be summed in practice. Based on Eq. 6, the THD of the simulated displacement sensor: $THD=\sqrt{0.005^2+0.025^2}=2.55\%$.

Since the ratio between input and output signals is a function of displacement, a compensation function to compensate the distortion can be derived when the difference is known. The compensation function may be derived analytically or from numerical model(s) or can be measured from sensor signals.

Figure 9:
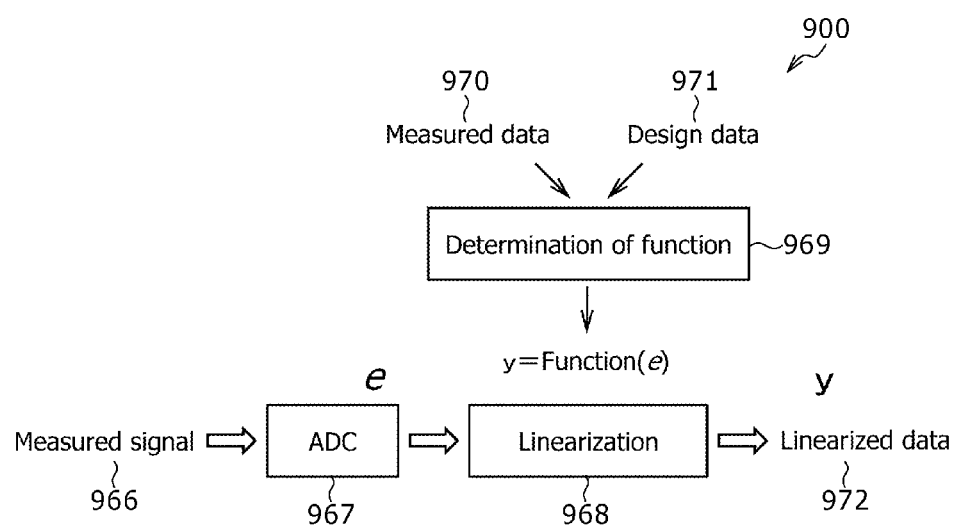
FIG. 9 shows a block diagram illustrating a flow for digital compensation of distortion to, for example, correct for the total harmonic distortion as shown in FIG. 7.

FIG. 9 is a block diagram that generally outlines digital compensation of distortion in accordance with an embodiment of the present disclosure. In the embodiment of the digital compensation system 900 of FIG. 9, the measured signal 966 output from a displacement sensor described with respect to FIGS. 1-2 and 1-4 is received at an Analog-to-Digital Converter 967 and passed for linearization at 968. In an embodiment, the linearization at 968 may be performed by the distortion compensation module 238 described with respect to FIG. 2. In order to linearize the measured signal 966, the determination of a compensation function at 969 is performed. The determination of a compensation function at 969 may be performed, for example, by the compensation calculation module 237 described with respect to FIG. 2 based on measured data 970 or design data 971. The compensation function, represented in FIG. 9 as a function: y=Function (e), is applied during the linearization at 968, resulting in output that is undistorted, or linearized, at 972.

Figure 10:
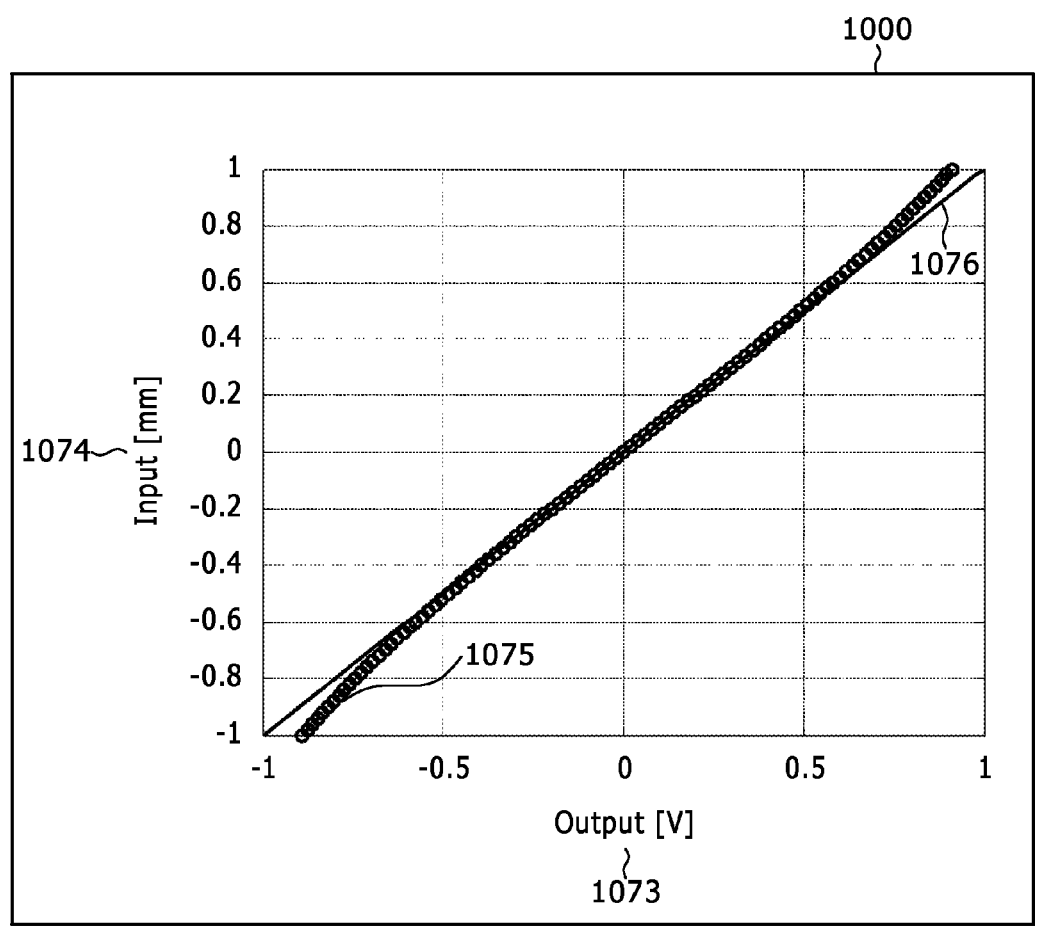
FIG. 10 shows a plot for an embodiment of total harmonic distortion compensation function based on a third-order polynomial approximation for the modeled sensor characterized by FIGS. 6 and 7, showing the input-output characteristic for input signal, output signal, and compensated or corrected output signal.

FIG. 10 shows a plot 1000 for an example embodiment of an input-output characteristic of total harmonic distortion compensation function for the modeled sensor characterized by FIGS. 6 and 7. The horizontal axis 1073 is the output signal in volts (V), while the vertical axis 1074 is the input displacement in millimeters (mm). The circle plot 1075 in FIG. 10 shows the same modeled input-output characteristic as shown in FIG. 6, but input and output are swapped based on a compensation function. By inserting the output signal from a displacement sensor, the techniques of the present disclosure can output a signal corrected from distortion and equivalent to input displacement, in the circle line 1075. A corrective compensation function may act to swap the input and the output of the displacement sensor.

To generate the undistorted output plotted in FIG. 10, a corrective function can be obtained from the input-output characteristic shown in FIG. 10 by applying a third-order polynomial fitting as follows:

$$y=0.1136e^3-0.0122e^2+0.9968e+0.0002 \quad \text{Equation 7}$$

By applying an output signal e into Equation 7, a compensated signal y (having artifacts in higher order harmonics) can be plotted, as identified by line 1075.

Figure 11:
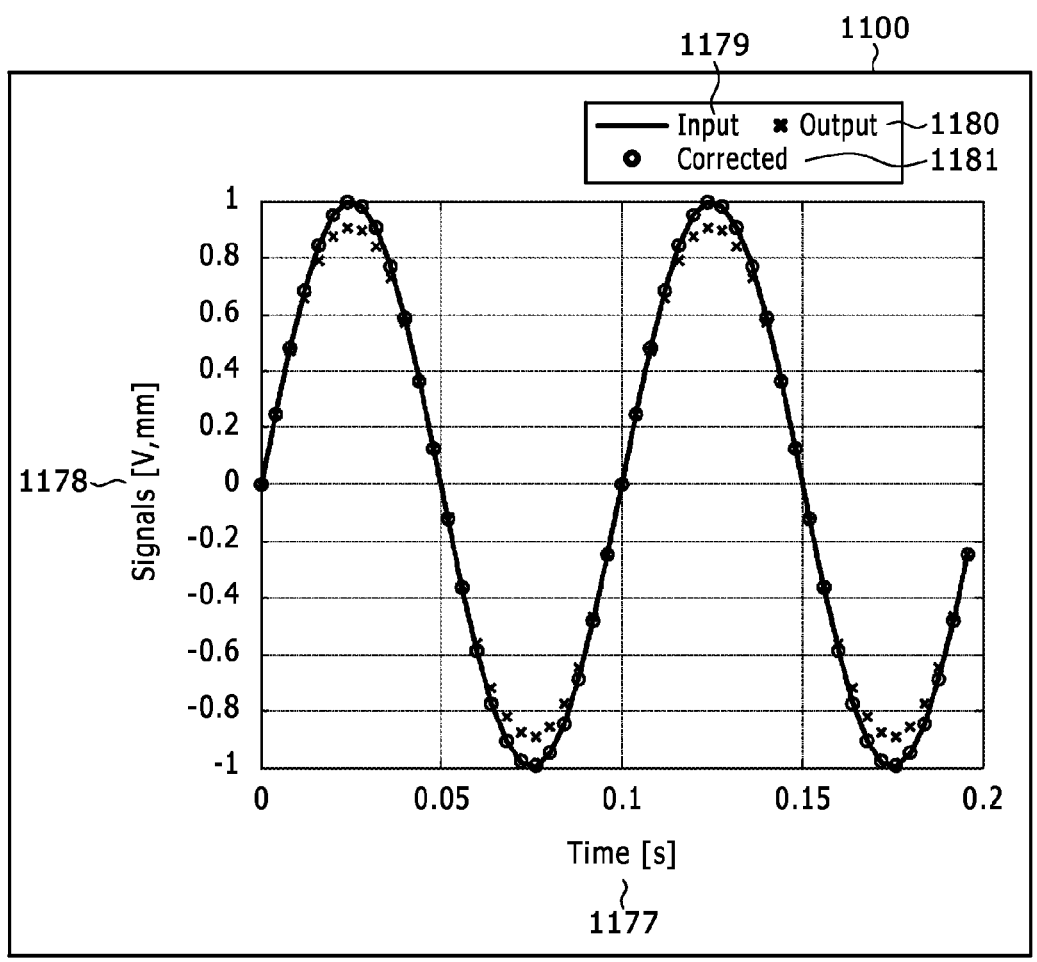
FIG. 11 shows a plot for input signal, output signal, and compensated or corrected output signal over time.

FIG. 11 shows a plot 1100 for input signal, output signal, and compensated or corrected output signal compensated using a third-order polynomial over time. The horizontal axis 1177 is time in seconds (s) and the vertical axis 1178 is various signal amplitudes in volts or millimeters (V, mm). In FIG. 11, the solid line 1179 represents the input displacement x, the "x" plot 1180 shows the output signal e, and the "circle" plot 1181 indicates the corrected, compensated signal y. As shown in FIG. 11, the deviation between the input 1179 and the output in the peaks and the valleys is apparent for the uncompensated output 1180, but is significantly reduced in the compensated output 1181 in time domain.

Figure 12:
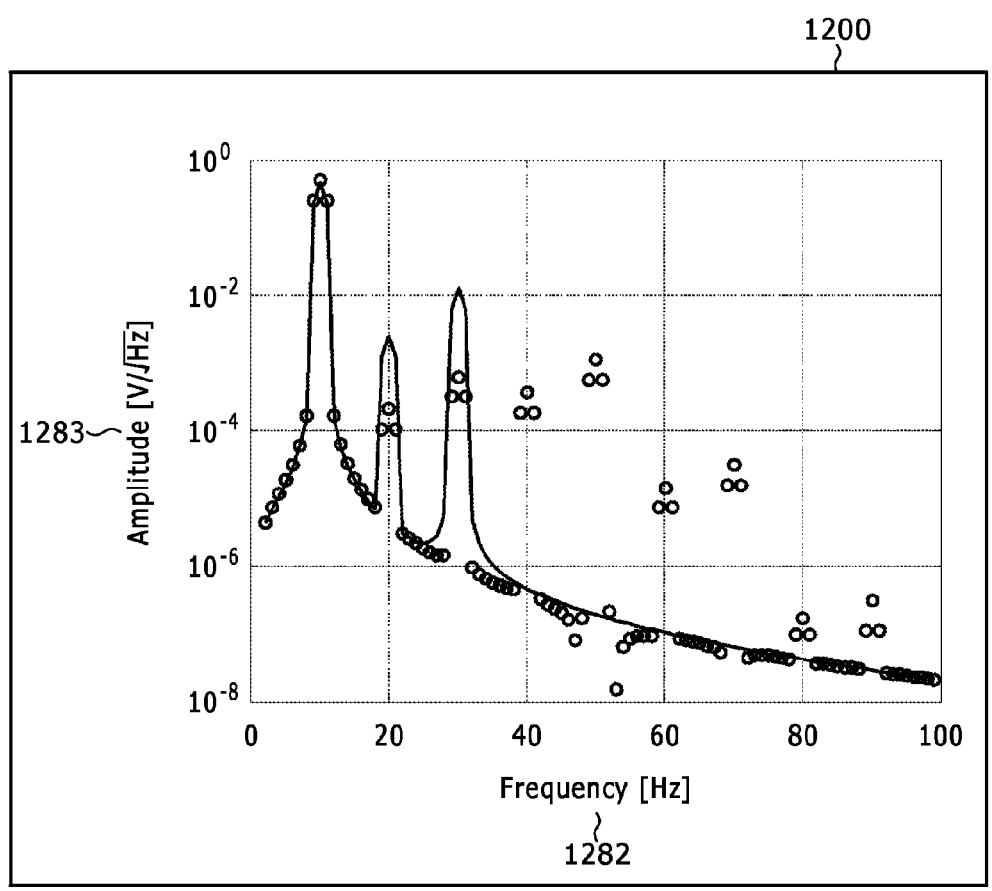
FIG. 12 shows a plot of amplitude spectra over various frequencies for the modeled non-linear sensor characterized by FIGS. 6 and 7, when the total harmonic distortion is reduced by using a third-order polynomial function.

FIG. 12 shows a plot 1200 of amplitude spectra over various frequencies for the modeled non-linear sensor characterized by FIGS. 6 and 7, when the total harmonic distortion is compensated for using a third-order polynomial function, as described above. The horizontal axis 1282 is frequency in Hertz (Hz) and the vertical axis 1283 is amplitude in volts per square root Hertz (V/√Hz). As in FIG. 12, the solid line represents the amplitude of the uncompensated output signal for the sensor. The circles represent the amplitude of the compensated, corrected output signal for the sensor. As compared with the uncompensated frequency analysis, the second harmonic is reduced from 0.5% to 0.2%, and the third harmonic is reduced from 2.5% to 0.5%. In the THD compensation based on a third-order polynomial compensation function, although the second and third harmonics are reduced, causality may appear at higher order harmonics. To improve the causality, another compensation function can be used, in addition to or in place of, the third-order polynomial compensation function.

For a particular sensor, the margin of error may be identified. For example, for the sensor described above, the sensor, based on the plots, is 97.45% correct. Additionally, the majority of the sensor response is proportional to the displacement x. For this reason, a more accurate approximation may be obtained by filling the errors of remaining percentage, that is, for the example sensor, 2.55%. In an embodiment, a lookup table may be built, populated, and then used. The input-output data may be stored in a table, and then used to develop a function based on sensor displacement corresponding to output signal. In an example embodiment, the lookup table can be used to calculate displacement by linear interpolation of two adjacent data as shown in FIG. 13.

Figure 13:
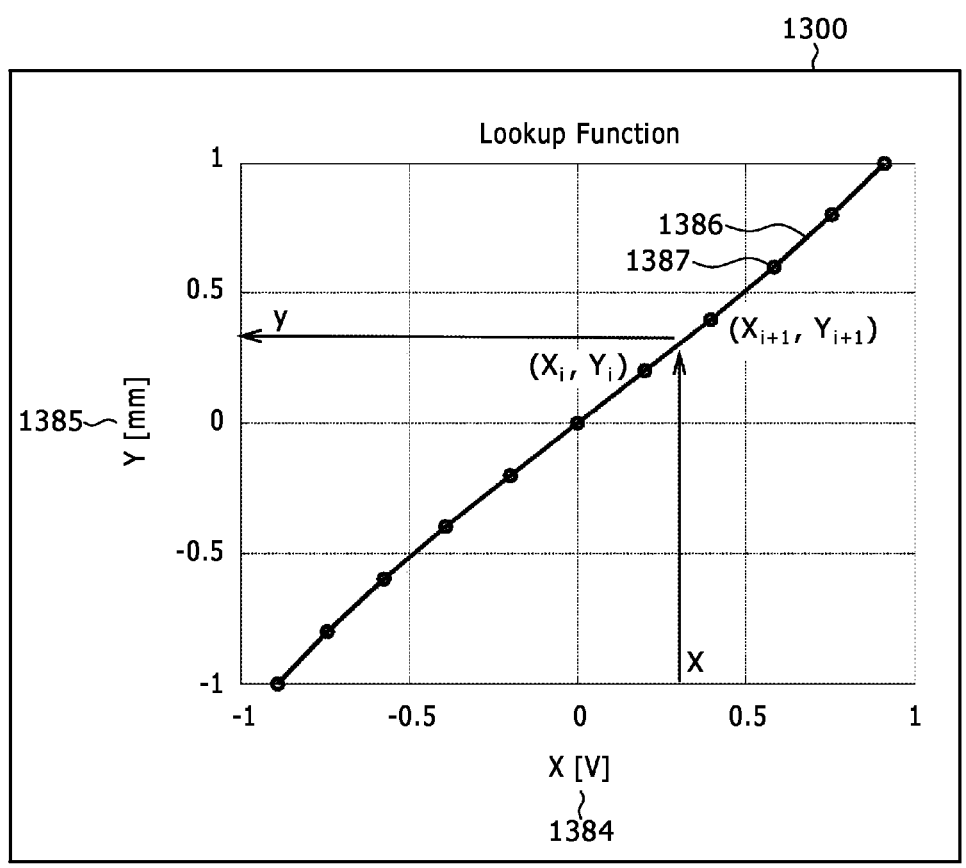
FIG. 13 shows a plot of an example look-up function for digitally compensating for total harmonic distortion.

FIG. 13 shows a plot 1300 of an example look-up function for compensating digitally for total harmonic distortion. The horizontal axis 1384 is the inputs in volts (V), and the vertical axis 1385 is the outputs in millimeters (mm). The expression of the linear interpolation 1386 is:

$$y = \frac{Y_{i+1} - Y_i}{X_{i+1} - X_i}(x - X_i) + Y_i \qquad \text{Equation 8}$$

where X represents stored output data from the sensor, and Y represents stored input data in the look-up table. The pairs 1387 of X and Y are shown as open circles in FIG. 13. x represents the actual output signal from the sensor, and y represents compensated displacement data. Each discrete point shown as a circle point on the plot is connected through linear interpolation according to a function, such as Equation 8. The look-up function can find the largest number $X_i$ that is still smaller than x. $Y_i$ is the corresponding number to $X_i$ in the look-up table. $(X_{i+1}, Y_{i+1})$ is the next set of numbers in the look-up table. The look-up function can calculate the compensated data y by using $X_i, Y_i, X_{i+1}, Y_{i+1}$, and given signal x from the sensor by using Equation 8. To improve accuracy, higher order interpolation may be used; however, the linear interpolation is easy to compute if a large set of input-output data is saved in the look-up table.

Figure 14:
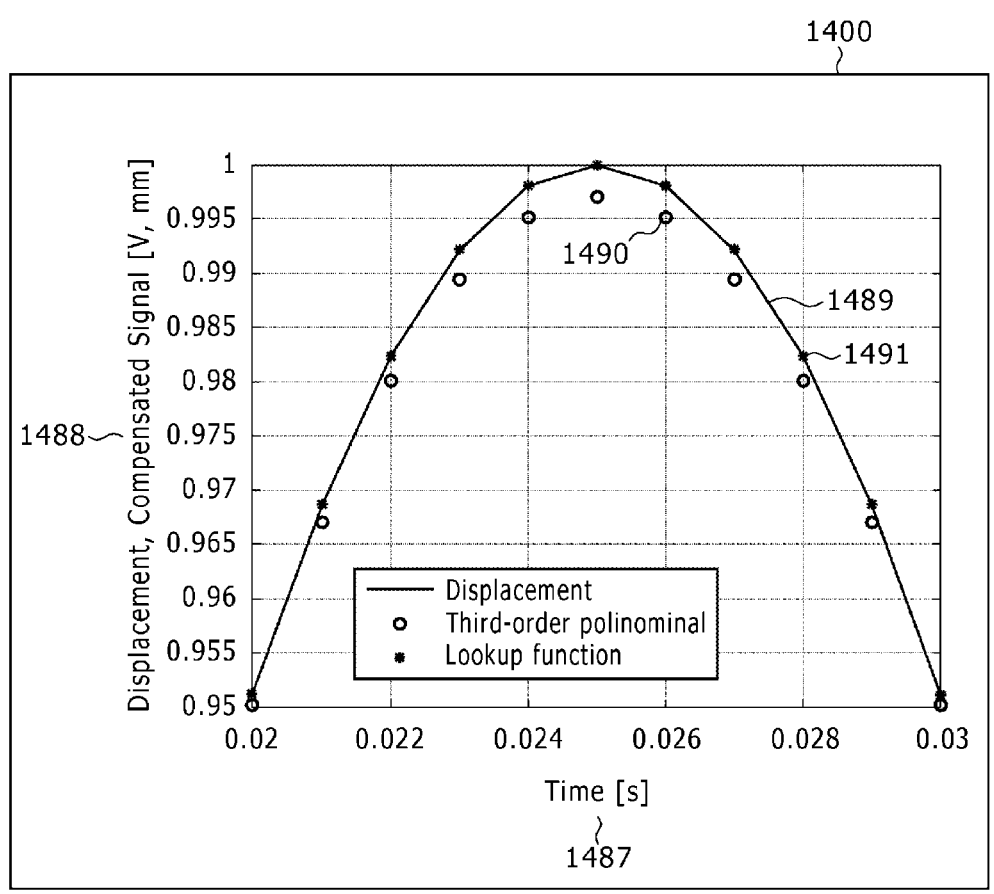
FIG. 14 shows a zoomed plot of input displacement compared to signals compensated according to the present disclosure, plotted against time.

FIG. 14 shows a plot 1400 of input displacement compared to signals compensated according to the present disclosure, plotted against time. The horizontal axis 1487 is time in second (s), while the vertical axis 1488 is displacement, both for an input displacement and for an output signal representative of the displacement, measured in Volts (V) and millimeters (mm) respectively.

The solid line 1489 in FIG. 14 shows the undistorted input signal. The solid points 1491 shows output compensated by using the look-up table populated with input-output characterization data for the sensor. The result of the third-order polynomial compensation is also shown as discrete points defined by the open circles 1490, for comparison. Since the scale of difference between the two methods of digital compensation (look-up table vs. polynomial approximation) is small for this example, the plot 1400 is zoomed in on the portion of a peak to illustrate that there is, in fact, a difference between the results of the two methods (solid points v. open circles). For the example look-up table used here, the full scale data (from −1 to +1) are stored for each 0.02 mm increment. The corrected signal by using the look-up table substantially overlaps with the undistorted input signal even in this zoomed scale.

Figure 15:
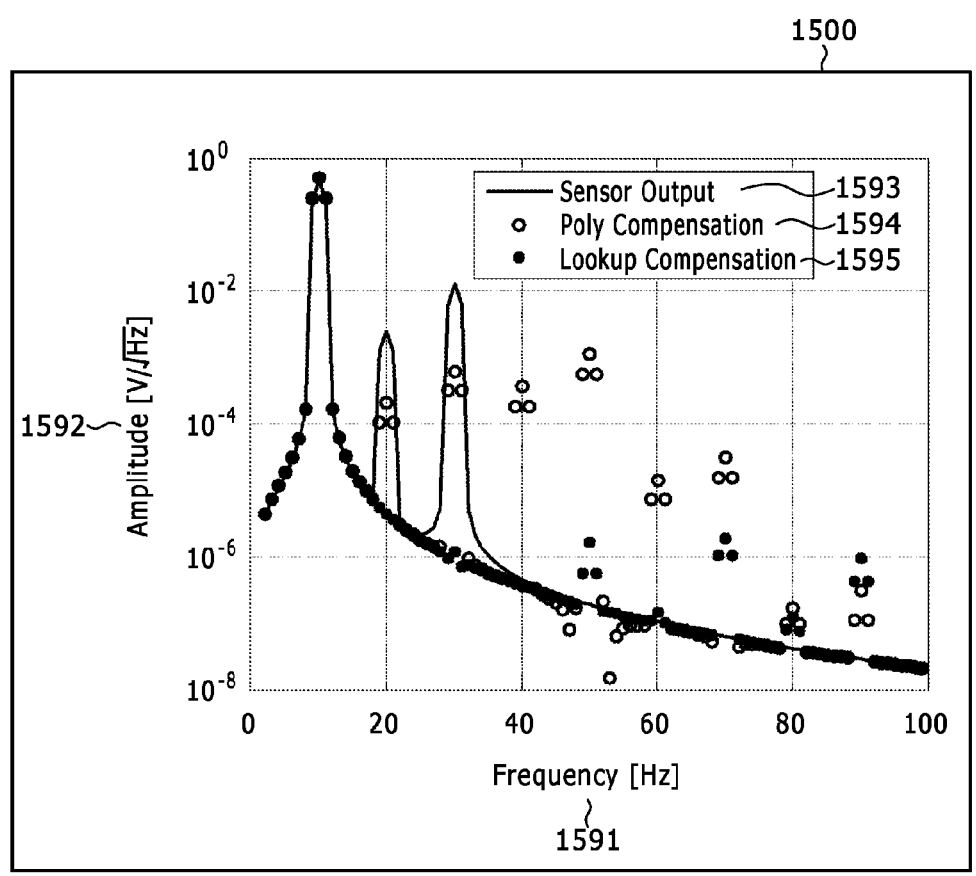
FIG. 15 shows a plot comparing the frequency analysis of compensated results obtained using a lookup table compared to a third-order polynomial fitting, plotted with uncompensated sensor output.

FIG. 15 shows a plot 1500 comparing the frequency analysis of compensated results obtained using digital compensation based on a lookup table and linearization function, as compared to a third-order polynomial fitting, plotted with uncompensated output of the sensor characterized by FIGS. 6 and 7. The horizontal axis 1591 is the frequency in Hertz (Hz); the vertical axis 1592 is the amplitude in Volts/square root Hertz (V/√Hz). The uncompensated sensor output is plotted in a solid line 1593, the sensor output compensated for distortion based on a third-order polynomial compensation function is plotted in open circles 1594, and the sensor output compensated for distortion based on a lookup table (based on the sensor's input-output characteristics) and linearization function is plotted by solid circles 1595. For the look-up table and linearization function compensation, the total harmonic distortion is reduced to the level of −120 dB or 0.0001%. As long as the input-output characteristics of a displacement sensor are known, a compensation function can be developed to interchange the input and the output, and the original undistorted input signal can be numerically reproduced without manipulation or design changes to the hardware of the sensor.

Figure 16:
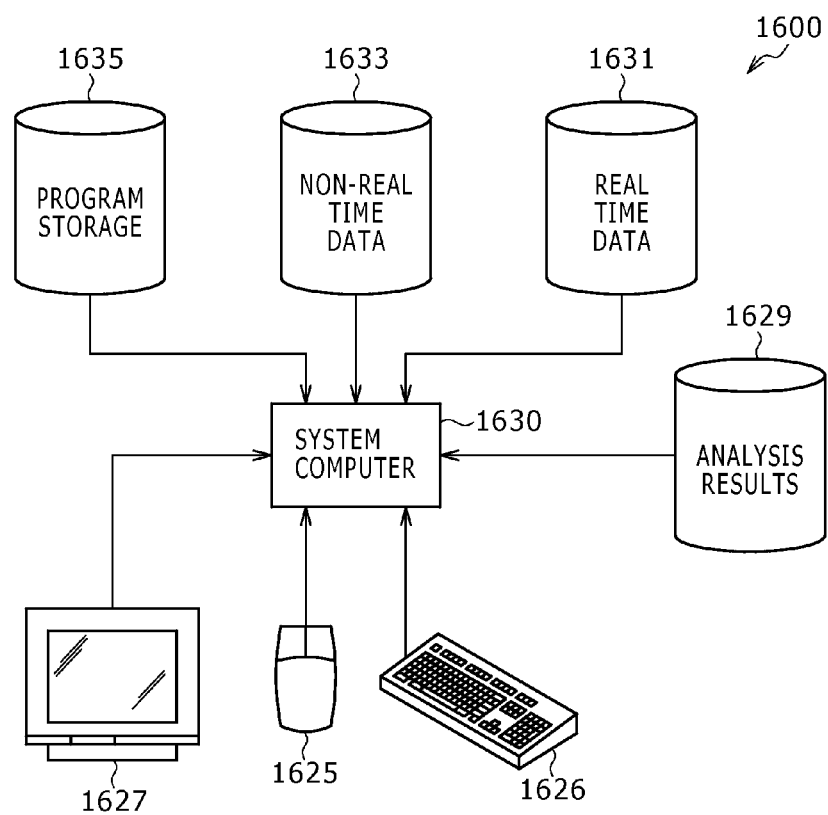
FIG. 16 shows a block diagram of a computer system that could be used to implement a method of the present disclosure.

FIG. 16 illustrates a computing system 1600, into which various technologies described herein may be implemented. The computing system 1600 may include one or more system computers 1630, which may be implemented as any suitable personal computer or server. However, the skilled persons will appreciate that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer(s) 1630 may be in communication with disk storage devices 1629, 1631, and 1633, which may be external hard disk storage devices. Disk storage devices 1629, 1631, and 1633 can be any suitable hard disk drives, and as such, may be implemented by way of a local area network or by remote access. In this example, while disk storage devices 1629, 1631, and 1633 are illustrated as separate devices, a single disk storage device may be used to store any and all of the program instructions, measurement data, and results as desired.

In one implementation, data received at the system computer(s) 1630 may be stored in disk storage device 1631. The system computer(s) 1630 may retrieve the appropriate data from the disk storage device 1631 to process data according to program instructions that correspond to implementations of various technologies described herein. The program instructions may be written in a computer programming language, such as C++, Java and the like. The program instructions may be stored in a computer-readable medium, such as program disk storage device 1635. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer(s) 1630.

Communication media may embody computer-readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, the system computer(s) 1630 may present output primarily onto graphics display 1627, or alternatively via printer (not shown). The system computer(s) 1630 may store the results of the methods described above on disk storage 1629, for later use and further analysis. The keyboard 1626 and the pointing device (e.g., a mouse, trackball, or the like) 1625 may be provided with the system computer(s) 1630 to enable interactive operation.

The system computer(s) 1630 may be located at a data center remote from the survey region. The system computer(s) 1630 may be in communication with the receivers (either directly or via a recording unit, not shown), to receive signals. These signals, after conventional formatting and other initial processing, may be stored by the system computer(s) 1630 as digital data in the disk storage 1631 for subsequent retrieval and processing in the manner described above. While FIG. 16 illustrates the disk storage 1631 as directly connected to the system computer(s) 1630, it is also contemplated that the disk storage device 1631 may be accessible through a local area network or by remote access. Furthermore, while disk storage devices 1629, 1631 are illustrated as separate devices for storing input data and analysis results, the disk storage devices 1629, 1631 may be implemented within a single disk drive (either together with or separately from program disk storage device 1735), or in any other conventional manner as will be fully understood by a skilled person having reference to this specification.

The geophones with the displacement sensor as shown in FIG. 1-4 embodying the present disclosure may find particular applications in seismic surveying equipment.

Figure 17:
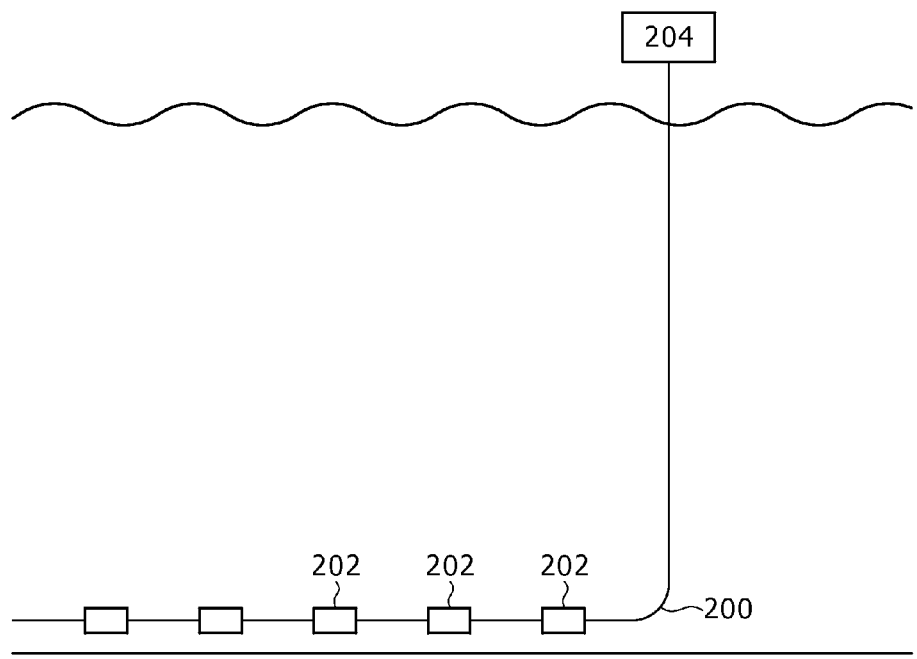
FIG. 17 shows a geophone in accordance with the present disclosure disposed on a sea bed cable.

FIG. 17 shows a seabed cable 200 which includes a number of geophone packages 202 spaced at regular intervals and connected through the cable 200 to a central recording system 204 to harvest, save and process data from seabed.

Figure 18:
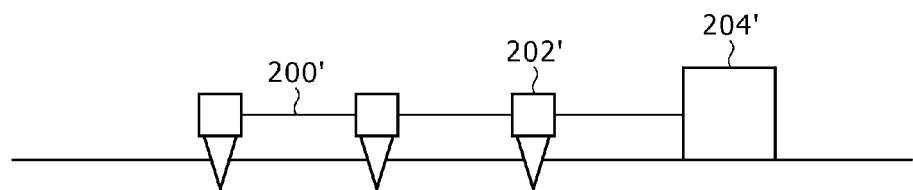
FIG. 18 shows a geophone in accordance with the present disclosure disposed on a land cable.

FIG. 18 shows a land cable 200' which has essentially the same configuration as the sea bed cable with geophones 202' spaced apart and connected to the central recording system 204'.

Figure 19:
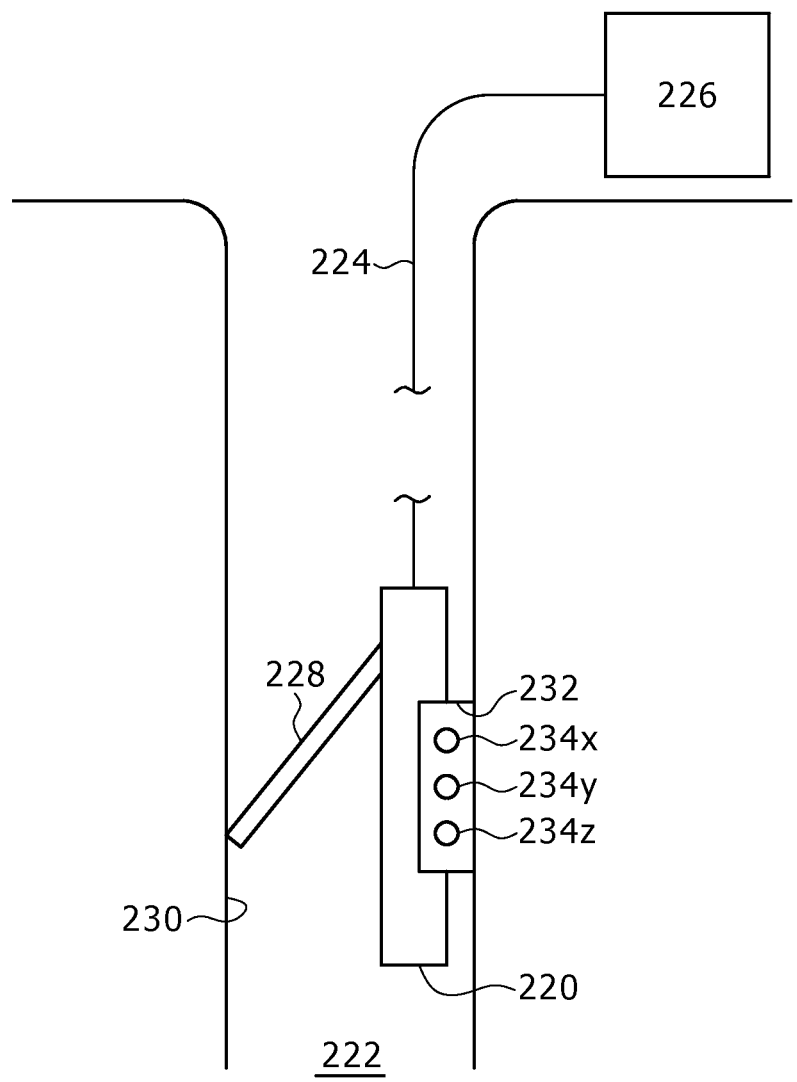
FIG. 19 shows a geophone in accordance with the present disclosure disposed on a borehole tool.

FIG. 19 shows a borehole tool comprising a tool body 220 which can be lowered into a borehole 222 on a wireline cable 224 connected to surface processing equipment 226. The tool body 220 includes an operable arm 228 which can be caused to bear against the borehole wall 230, and a sensor package 232 that is forced against the borehole wall 230 due to the action of the arm 228. The sensor package 232 contains three orthogonally oriented geophones 234$x$, 234$y$, 234$z$ (x, y, z directions) which can receive three component seismic signals and pass data back to the surface via the wireline cable 224.

Although a few example embodiments have been described in detail above, those skilled in the art will readily appreciate that many modifications are possible in the example embodiments without materially departing from this disclosure. Accordingly, such modifications are intended to be included within the scope of this disclosure as defined in the following claims. In the claims, means-plus-function clauses are intended to cover the structures described herein as performing the recited function and not simply structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words 'means for' together with an associated function.

What is claimed is:

1. A method for digital compensation for total harmonic distortion in a displacement sensor, comprising:
    providing a vibration transducer having a moving mass;
    determining a total harmonic distortion compensation function for a displacement sensor;
    using the displacement sensor to measure a displacement of the moving mass by generating an output signal having total harmonic distortion;
    digitizing the distorted output signal to generated output data with distortion;
    applying the total harmonic distortion compensation function to the distorted output data to generate undistorted output data indicative of the true displacement of the moving mass; and
    outputting the undistorted output data.

2. A method according to claim 1, wherein the total harmonic distortion compensation function is determined based on reference input displacements and resulting output signals from the displacement sensor.

3. A method according to claim 1, wherein the total harmonic distortion compensation function is determined upon a knowledge of input-output characteristics of the displacement sensor.

4. A method according to claim 1, wherein the total harmonic distortion compensation function is obtained by curve fitting input and output data.

5. A method according to claim 1, wherein the undistorted output data is obtained by interpolating input and output data stored in a lookup table using the distorted output data.

6. An apparatus for digital compensation for total harmonic distortion in a displacement sensor, comprising:
a vibration transducer having a moving mass;
a compensation calculation module configured to determine a total harmonic distortion compensation function for a displacement sensor;
a digitization module configured to digitize an output signal from the displacement sensor having total harmonic distortion to generate output data with distortion;
a distortion compensation module configured to apply the total harmonic distortion compensation function to the distorted output data to generate undistorted output data indicative of the true displacement of the moving mass; and
an output interface configured to output the undistorted output data.

7. An apparatus according to claim 6, wherein the compensation calculation module is configured to determine the total harmonic distortion compensation function based on reference input displacements and resulting output signals from the displacement sensor.

8. An apparatus according to claim 6, wherein the compensation calculation module is configured to determine the total harmonic distortion compensation function upon a knowledge of input-output characteristics of the displacement sensor.

9. An apparatus according to claim 6, wherein the compensation calculation module is configured to determine the total harmonic distortion compensation function by curve fitting input and output data.

10. An apparatus according to claim 6, further comprising a lookup table module configured to obtain the undistorted output data by interpolating input and output data stored in a lookup table using the distorted output data.

11. A sensor, comprising:
a vibration transducer having a moving mass; and
a displacement sensor configured to measure a true displacement of the moving mass, wherein said displacement sensor is digitally compensated for total harmonic distortion by determining a total harmonic distortion compensation function for the displacement sensor; generating an output signal having total harmonic distortion from a displacement of the moving mass; digitizing the distorted output signal to generated output data with distortion; and applying the total harmonic distortion compensation function to the distorted output data to generate undistorted output data indicative of the true displacement of the moving mass.

12. A sensor according to claim 11, wherein the vibration transducer comprises a geophone or an accelerometer.

13. A sensor according to claim 11, wherein the total harmonic distortion compensation function is determined based on reference input displacements and resulting output signals from the displacement sensor.

14. A sensor according to claim 11, wherein the total harmonic distortion compensation function is determined upon a knowledge of input-output characteristics of the displacement sensor.

15. A sensor according to claim 11, wherein the total harmonic distortion compensation function is obtained by curve fitting input and output data.

16. A sensor according to claim 11, wherein the undistorted output data is obtained by interpolating input and output data stored in a lookup table using the distorted output data.

* * * * *